United States Patent
Maeshima

(10) Patent No.: US 10,416,943 B2
(45) Date of Patent: Sep. 17, 2019

(54) IMAGE FORMATION SYSTEM, IMAGE FORMATION SYSTEM CONTROL METHOD, AND COMPUTER-READABLE RECORDING MEDIUM STORING IMAGE FORMATION SYSTEM CONTROL PROGRAM

(71) Applicant: Konica Minolta, Inc., Chiyoda-ku, Tokyo (JP)

(72) Inventor: Toshiyuki Maeshima, Machida (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/891,572

(22) Filed: Feb. 8, 2018

(65) Prior Publication Data
US 2018/0260179 A1 Sep. 13, 2018

(30) Foreign Application Priority Data
Mar. 8, 2017 (JP) .................. 2017-043881

(51) Int. Cl.
*G06F 3/12* (2006.01)
*B41J 29/38* (2006.01)
*H04N 1/00* (2006.01)
*G06F 3/01* (2006.01)
*G06F 3/06* (2006.01)
*G06F 3/16* (2006.01)

(52) U.S. Cl.
CPC .......... *G06F 3/1288* (2013.01); *B41J 29/38* (2013.01); *G06F 3/011* (2013.01); *G06F 3/0623* (2013.01); *G06F 3/1221* (2013.01); *G06F 3/1222* (2013.01); *G06F 3/1229* (2013.01); *G06F 3/1267* (2013.01); *G06F 3/1285* (2013.01); *H04N 1/00689* (2013.01); *H04N 1/00766* (2013.01); *G06F 3/167* (2013.01); *H04N 2201/0094* (2013.01)

(58) Field of Classification Search
CPC ...... G06F 3/1288; G06F 3/011; G06F 3/0623; G06F 3/1222; B41J 29/38; H04N 1/00689; H04N 1/00766; H04N 2201/0094
USPC ....................................................... 358/1.15
See application file for complete search history.

(56) References Cited

U.S. PATENT DOCUMENTS

| 6,775,729 B1 * | 8/2004 | Matsuo ................. G06F 3/1211 710/260 |
| 2011/0007079 A1 * | 1/2011 | Perez ..................... G06F 3/011 345/473 |

(Continued)

FOREIGN PATENT DOCUMENTS

| JP | 2014124866 A | 7/2014 |
| JP | 2015099172 A | 5/2015 |
| JP | 2016010903 A | 1/2016 |

*Primary Examiner* — Neil R McClean
(74) *Attorney, Agent, or Firm* — Buchanan Ingersoll & Rooney PC

(57) ABSTRACT

Provided is an image formation system including a plurality of image formation devices, for example, two image formation devices. The image formation devices each include a human body detector that detects whether human bodies are present in the vicinity of respective image formation devices. The image formation system stores information based on the result of human body detection by the human body detector and manages the tendency of persons in the vicinity of the image formation devices in accordance with the stored information.

16 Claims, 11 Drawing Sheets

(56) References Cited

U.S. PATENT DOCUMENTS

| | | | |
|---|---|---|---|
| 2013/0010335 A1* | 1/2013 | Baba | G03G 15/5004 358/3.01 |
| 2014/0092414 A1* | 4/2014 | Tezuka | H04N 1/00395 358/1.13 |
| 2017/0163829 A1* | 6/2017 | Fujioka | H04N 1/00891 |
| 2017/0264766 A1* | 9/2017 | Okamoto | G06F 1/3231 |
| 2017/0329470 A1* | 11/2017 | Nishiyama | G06F 3/0482 |
| 2018/0157449 A1* | 6/2018 | Nobutani | G06F 3/1286 |

* cited by examiner

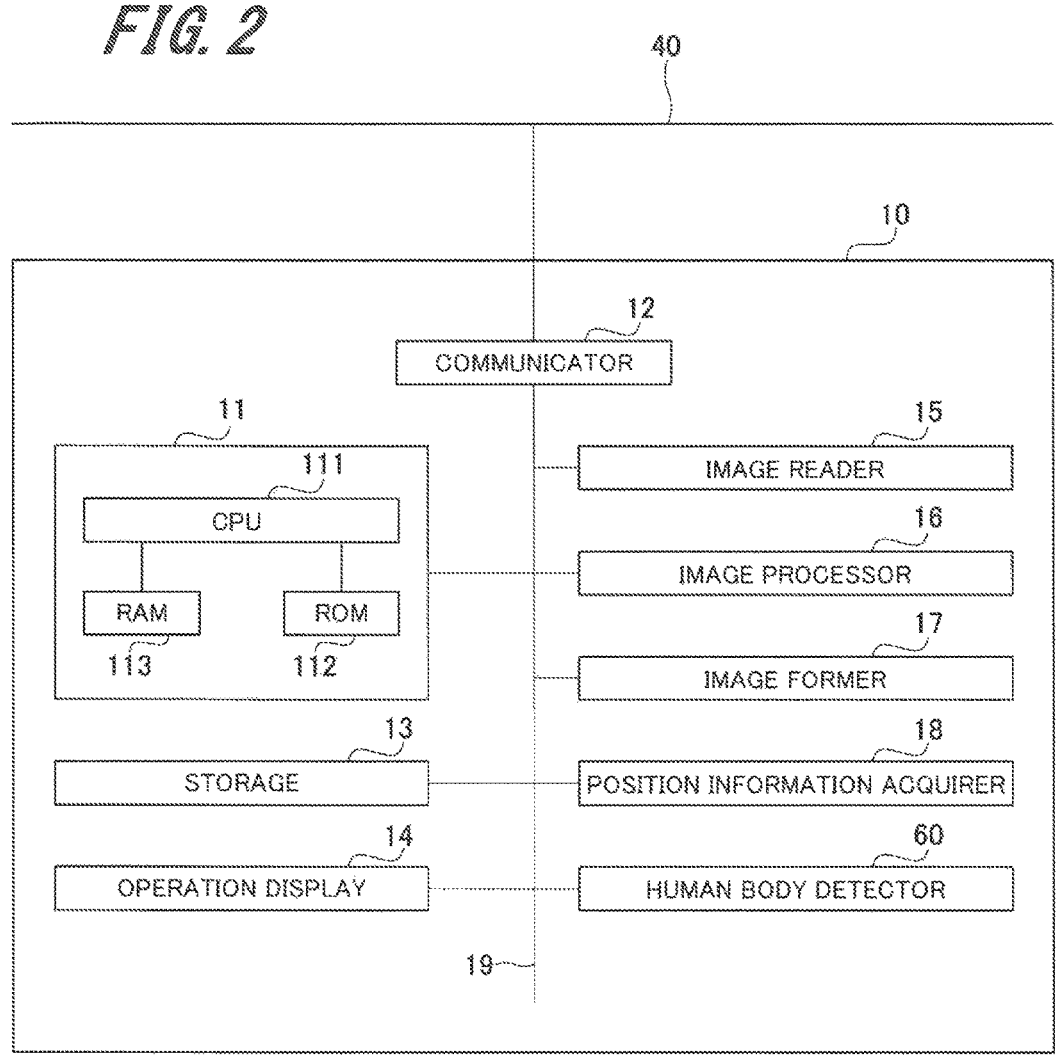

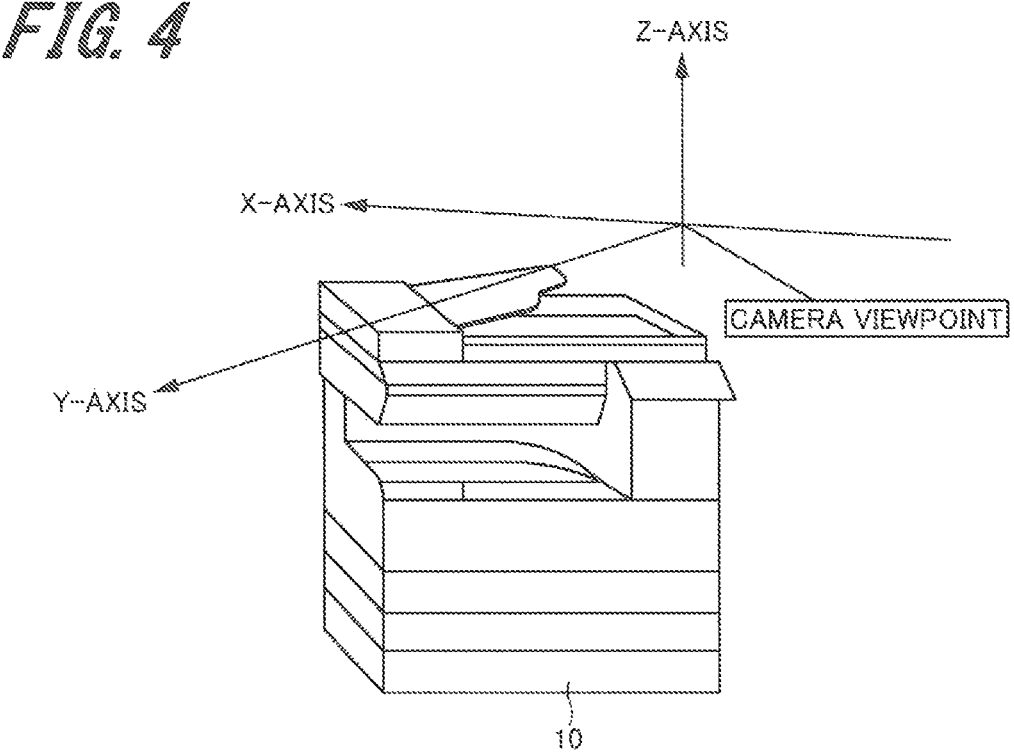

FIG. 5

TIME 0

| # | ID IDENTIFICATION NUMBER | PARTS COORDINATES (X, Y, AND Z COORDINATES) | | | |
|---|---|---|---|---|---|
| | | HEAD | NECK | SHOULDER 1 | SHOULDER 2 |
| 1 | | | | | |
| 2 | | | | | |
| 3 | | | | | |
| 4 | | | | | |

TIME 1

| # | ID IDENTIFICATION NUMBER | PARTS COORDINATES (X, Y, AND Z COORDINATES) | | | |
|---|---|---|---|---|---|
| | | HEAD | NECK | SHOULDER 1 | SHOULDER 2 |
| 1 | xxxx | (xt01,yt01,zt01) | (xk01,yk01,zk01) | (xa01,ya01,za01) | (xb01,yb01,zb01) |
| 2 | | | | | |
| 3 | | | | | |
| 4 | | | | | |

TIME 2

| # | ID IDENTIFICATION NUMBER | PARTS COORDINATES (X, Y, AND Z COORDINATES) | | | |
|---|---|---|---|---|---|
| | | HEAD | NECK | SHOULDER 1 | SHOULDER 2 |
| 1 | xxxx | (xt02,yt02,zt02) | (xk02,yk02,zk02) | (xa02,ya02,za02) | (xb02,yb02,zb02) |
| 2 | yyyy | (xt11,yt11,zt11) | (xk11,yk11,zk11) | (xa11,ya11,za11) | (xb11,yb11,zb11) |
| 3 | | | | | |
| 4 | | | | | |

TIME 3

| # | ID IDENTIFICATION NUMBER | PARTS COORDINATES (X, Y, AND Z COORDINATES) | | | |
|---|---|---|---|---|---|
| | | HEAD | NECK | SHOULDER 1 | SHOULDER 2 |
| 1 | xxxx | (xt03,yt03,zt03) | (xk03,yk03,zk03) | (xa03,ya03,za03) | (xb03,yb03,zb03) |
| 2 | | | | | |
| 3 | zzzz | (xt21,yt21,zt21) | (xk21,yk21,zk21) | (xa21,ya21,za21) | (xb21,yb21,zb21) |
| 4 | | | | | |

TIME 4

| # | ID IDENTIFICATION NUMBER | PARTS COORDINATES (X, Y, AND Z COORDINATES) | | | |
|---|---|---|---|---|---|
| | | HEAD | NECK | SHOULDER 1 | SHOULDER 2 |
| 1 | | | | | |
| 2 | | | | | |
| 3 | zzzz | (xt22,yt22,zt22) | (xk22,yk22,zk22) | (xa22,ya22,za22) | (xb22,yb22,zb22) |
| 4 | | | | | |

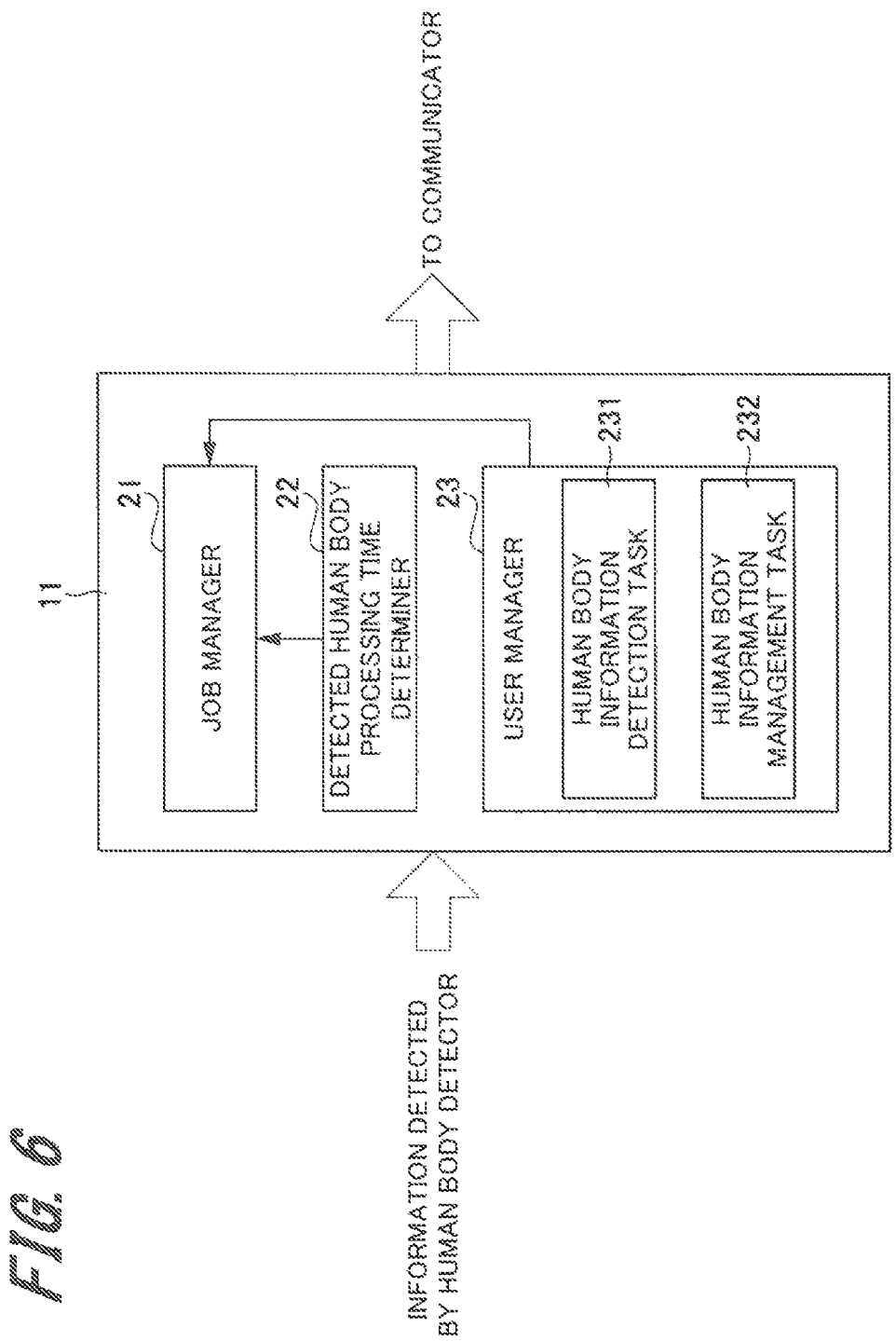

FIG. 11

| DOCUMENT NAME | STATUS | OWNER | PAGES | SIZE | RECEPTION TIME | PORT |
|---|---|---|---|---|---|---|
| DOCUMENT 1.DOC | PRINTING | Taro | 1 | 44.2KB | 15:45:26 2014/09/10 | |
| DOCUMENT 2.DOC | WAITING | Taro | 1 | 44.2KB | 15:45:23 2014/09/10 | |
| USER 01 | STAYING | | | 07 MIN | | |
| USER 02 | STAYING | | | 04 MIN | | |

SKT_C652SeriesPCL_2OPS-
PRINTER(P) DOCUMENT(D) VIEW(V)

3 DOCUMENTS IN QUEUE

IMAGE FORMATION SYSTEM, IMAGE FORMATION SYSTEM CONTROL METHOD, AND COMPUTER-READABLE RECORDING MEDIUM STORING IMAGE FORMATION SYSTEM CONTROL PROGRAM

CROSS-REFERENCE TO RELATED APPLICATIONS

The entire disclosure of Japanese Patent Application No. 2017-043881, filed on Mar. 8, 2017, is incorporated herein by reference in its entirety.

BACKGROUND

An image formation device (for example, refer to Patent Literature 1 to Patent Literature 3) includes a detector that detects a human body. When the detector detects an operator in the vicinity of the image formation device, the image formation device described in Patent Literature 1 is capable of confirming the status of a job managed by a job manager even in a sleep state and displaying the status of a currently processed or unprocessed job.

While the detector detects a human body having operated a job in a region close to the image formation device, the image formation device described in Patent Literature 2 exercises control to inhibit the transition to a sleep mode in which the power supply is shut off. If a human body is continuously detected by the detector for a specific period of time after a new print job is generated by a job generator, the image formation device described in Patent Literature 3 assigns a higher execution priority to the new print job than to an unfinished job.

Technological Field

The present invention relates to an image formation system, an image formation system control method, and a computer-readable recording medium storing an image formation system control program.

Description of the Related Art

[Patent Literature 1] Japanese Unexamined Patent Application Publication No. 2014-124866
[Patent Literature 2] Japanese Unexamined Patent Application Publication No. 2015-99172
[Patent Literature 3] Japanese Unexamined Patent Application Publication No. 2016-10903

SUMMARY

In an image formation system network-connected to a plurality of image formation devices, a user submits a print job to an image formation device through a network from a personal computer or server disposed at a distance from the image formation devices. In such an instance, the user preferably submits the print job after selecting an image formation device that will deliver printed matter most rapidly to the user.

Consequently, for example, a printer driver, a web-type device information verifier, or a server system acquires print job (print queue) information processed by a respective image formation device and presents the acquired information to the user by displaying the acquired information on the printer driver or the device information verifier. Meanwhile, the server assists the user in acquiring the printed matter immediately by predicting, for example, the end time of a currently processed print job.

However, if another user is already engaged in a panel operation when a print job is to be executed by operating a panel of an image formation device (e.g., if a destination input operation is being performed with a document placed on an automatic document feeder (ADF)), it is difficult to interrupt such a panel operation. Making a print by performing a panel operation is, for example, a case where box storage printing is performed in relation to a confidential job (confidential printing) or other similar job stored in the image formation device or a case where pull printing is performed by accessing, downloading, and printing a document stored in a server.

As described above, if another user is already engaged in a panel operation, it is necessary to wait until the operation of that user is finished. This results in a delay in the acquisition of a deliverable (output product). Further, if a confidential job (confidential printing) is to be executed, an output operation is performed near the other users lined up. This may impair security because the output product is visible to the other users.

Demanded under the above circumstances is an image formation system that is capable of managing the tendency of persons in the vicinity of a plurality of image formation devices, that is, for example, determining whether persons concerned with the image formation devices are present near the image formation devices, in a situation where, for example, a print job is to be submitted or a specific image formation device from which printed matter is to be obtained after print job submission is to be determined. Patent Literature 1 to Patent Literature 3 describe an image formation device having a detector for detecting a human body, but do not consider the management of tendency of persons in the vicinity of a plurality of image formation devices.

The present invention has been made in view of the above circumstances and provides an image formation system, an image formation system control method, and a computer-readable recording medium storing an image formation system control program that are capable of managing the tendency of persons in the vicinity of a plurality of image formation devices, that is, for example, determining whether persons concerned with the image formation devices are present near the image formation devices.

To achieve at least one of the abovementioned objects, according to an aspect of the present invention, an image formation system reflecting one aspect of the present invention includes a plurality of image formation devices, a human body detector, a storage, and a manager. The image formation devices are connected to a network. The human body detector detects whether human bodies are present in the vicinity of the image formation devices. The storage stores information based on the result of human body detection by the human body detector. The manger manages the tendency of persons in the vicinity of the image formation devices in accordance with the information based on the human body detection result stored in the storage.

According to another aspect of the present invention, there is provided an image formation system control method that is exercised in an image formation system including a plurality of image formation devices and a human body detector. The image formation devices are connected to a network. The human body detector detects whether human bodies are present in the vicinity of the image formation devices. The image formation system control method causes the image formation system to perform: storing, in a storage, information based on the result of human body detection by the human body detector; and managing the tendency of persons in the vicinity of the image formation devices in accordance with the information based on the human body detection result stored in the storage.

According to still another aspect of the present invention, there is provided a computer-readable recording medium storing an image formation system control program that is executed in an image formation system including a plurality of image formation devices and a human body detector. The image formation devices are connected to a network. The human body detector detects whether human bodies are present in the vicinity of the image formation devices. The image formation system control program causes a computer to perform a process of storing, in a storage, information based on the result of human body detection by the human body detector, and managing the tendency of persons in the vicinity of the image formation devices in accordance with the information based on the human body detection result stored in the storage.

Managing the tendency of persons in the vicinity of a plurality of image formation devices makes it possible to determine whether a person in the vicinity of the image formation devices is using or planning to use an image formation device or is otherwise related to the image formation device.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention:

FIG. 2 is a block diagram illustrating an exemplary configuration of a control system of an image formation device;

FIG. 4 is a diagram illustrating an exemplary positional relationship between the image formation device and the viewpoint of the human body detector and exemplary detection coordinate axes;

FIG. 5 is a diagram illustrating an example of human body detection tables that store information based on the result of human body detection by the human body detector;

FIG. 6 is a functional block diagram illustrating a controller having the function of a manager;

FIG. 11 is a diagram illustrating an example of printer driver status display.

DETAILED DESCRIPTION OF EMBODIMENTS

Figure 1:
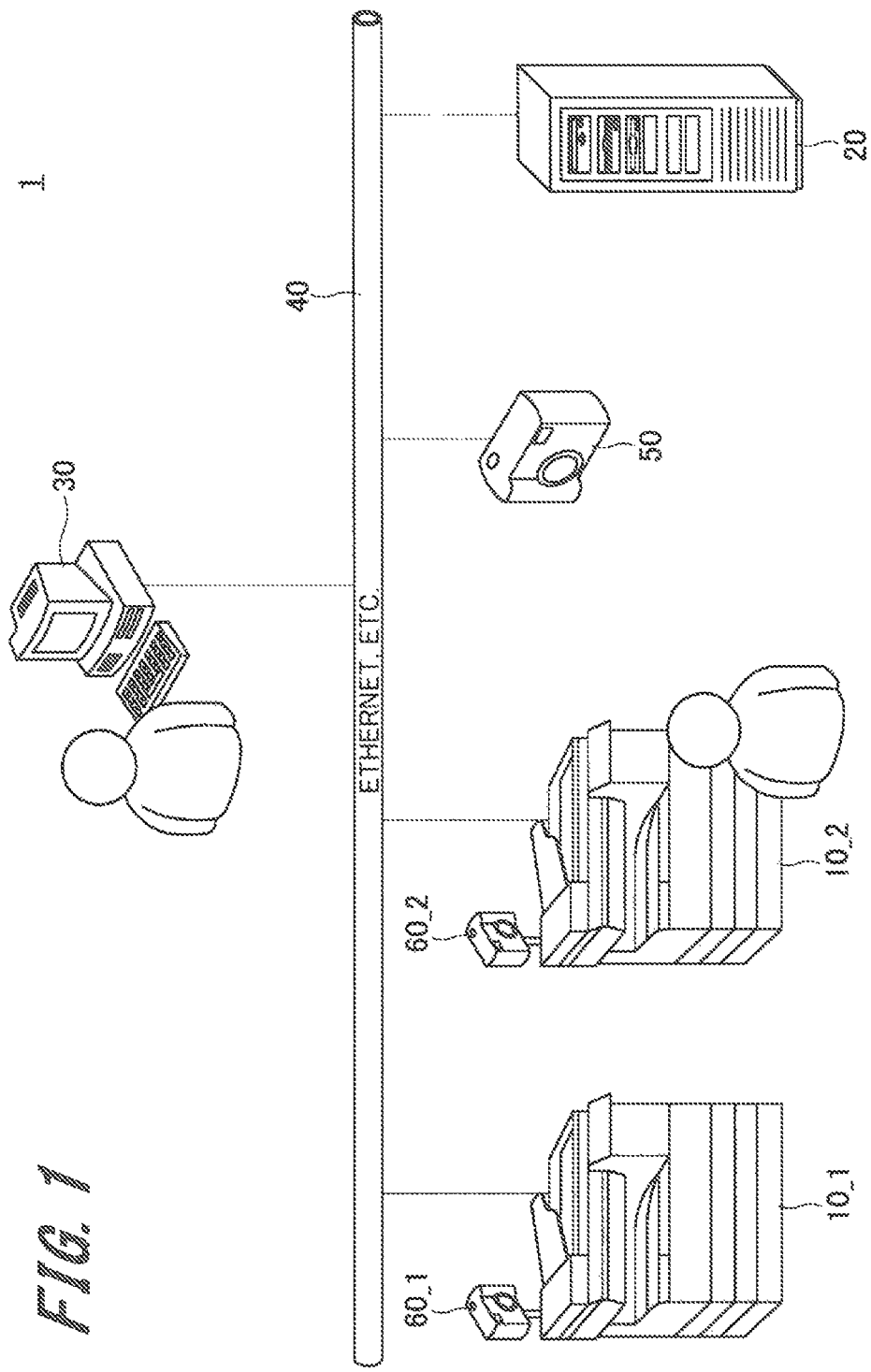
FIG. 1 is a schematic diagram illustrating a configuration of an image formation system according to an embodiment of the present invention.

Hereinafter, one or more embodiments of the present invention will be described with reference to the accompanying drawings. However, the scope of the present invention is not limited to the disclosed embodiments. For example, various numerical values mentioned in conjunction with the embodiments are merely illustrative and not restrictive. In the following description and in the accompanying drawings, identical elements or elements having the same functions are designated by the same reference numerals and will not be redundantly described.

[Configuration of Image Formation System]

FIG. 1 is a schematic diagram illustrating a configuration of an image formation system according to an embodiment of the present invention.

As illustrated in FIG. 1, the image formation system 1 according to the present embodiment is configured so that, for example, two image formation devices 10_1, 10_2, a print server 20, and a client PC (personal computer) 30 are communicatively connected through a network 40. The network 40 is further connected to a human body detector 50 that detects the presence of human bodies in the entire system. An Ethernet, telephone line, or other similar communication link or a dedicated communication line may be used as the network 40.

The connection of the image formation devices 10_1, 10_2, print server 20, client PC 30, and human body detector 50 to the network 40 is not specifically limited and may be either wired or wireless. The image formation devices 10_1, 10_2 (hereinafter may be generically referred to as the "image formation devices 10") respectively include human body detectors 60_1, 60_2 (hereinafter may be generically referred to as the "human body detectors 60") that detect the presence of human bodies in the vicinity of the image formation devices 10_1, 10_2.

For example, a camera or other image input device may be used as the human body detectors 50, 60 (60_1, 60_2). When formed of a camera or other image input device, the human body detectors 50, 60 are capable of detecting a face and its parts from an image captured, for example, by the camera, and thus detecting that one or more human bodies are present in the vicinity of the image formation devices 10.

The human body detectors 50, 60 are not limited to a camera or other image input device. Various sensors, such as a temperature sensor, an infrared ray sensor, an ultrasonic wave sensor, a laser Doppler sensor, a directional microphone, a pressure sensor, an operation panel touch sensor, and an authenticator, may be used as the human body detectors 50, 60.

More specifically, if, for example, a pressure sensor is used as the human body detectors 50, 60, a mat in which the pressure sensor is built in may be installed on a floor in the vicinity of the image formation devices 10 to detect a pressed portion of the mat on which a person walks. This makes it possible to detect the tendency of persons in the vicinity of the image formation devices 10. The tendency of persons may be, for example, the number of persons in the vicinity of the image formation devices 10, the positions of the persons, and the chronological movements of the persons.

If, for example, a directional microphone is used as the human body detectors 50, 60, changes in footstep loudness may be detected from a sound signal hearable in the vicinity of the image formation devices 10 as the tendency of persons in the vicinity of the image formation devise 10, which may indicate that persons are approaching the image formation devices 10. If, for example, an operation panel touch sensor or an authenticator is used as the human body detectors 50, 60, at least one user engaged in an operation can be detected as the tendency of persons in the vicinity of the image formation devise 10 by detecting an operation of the operation panel touch sensor or authenticator.

Further, an electronic tag carried by a user, such as an RFID (Radio Frequency Identification) tag, and a near-field communication device, such as a mobile terminal, may be used as the human body detectors 50, 60 in order to detect persons approaching the image formation devices 10 as the tendency of persons in the vicinity of the image formation devices 10.

When one or a combination of the above-mentioned devices is used as the human body detectors 50, 60, the tendency of persons in the vicinity of the image formation devices 10 can be detected based on the result of detection of the presence (existence) of human bodies.

In the image formation system 1 having the above-described configuration, cameras disposed integrally with the image formation devices 10_1, 10_2 are exemplified as the human body detectors 60_1, 60_2, and a surveillance camera disposed in the system and away from the image formation devices 10_1, 10_2 is exemplified as the human body detector 50. The system configuration exemplified here includes both the human body detector 50 and the human body detectors 60_1, 60_2. However, the system may alternatively be configured to include either the human body detector 50 or the human body detectors 60_1, 60_2.

The human body detector 50 may monitor the vicinity of the image formation devices 10_1, 10_2 and send an image captured by the surveillance camera to the image formation devices 10_1, 10_2 or to an external information manager (storage). The human body detectors 60_1, 60_2, which are formed integrally with the image formation devices 10_1, 10_2, can be disposed at a short distance from users in the vicinity of the image formation devices 10_1, 10_2. Therefore, even if the image resolution is low, the human body detectors 60_1, 60_2 can capture, for example, a clear image of users in the vicinity of the image formation devices 10_1, 10_2.

Further, the human body detector 50, which uses a surveillance camera installed at a distance from the image formation devices 10_1, 10_2, can lower the price of the entire system, for example, by extracting only image information from a primary surveillance camera system. Furthermore, when, for example, a single surveillance camera is used to capture the image of a large area in a time-division manner, the number of installed cameras can be decreased by using time-division images of a plurality of image formation devices 10 in an imaging area.

[Configuration of Image Formation Device Control System]

A configuration of a control system of the image formation devices 10 (10_1, 10_2) will now be described in detail with reference to FIG. 2. FIG. 2 is a block diagram illustrating an exemplary configuration of the control system of the image formation devices 10.

As illustrated in FIG. 2, the image formation devices 10 each include a controller 11, a communicator 12, a storage 13, an operation display 14, an image reader 15, an image processor 16, an image former 17, a position information acquirer 18, and a human body detector 60 (60_1, 60_2).

The controller 11 includes, for example, a CPU (Central Processing Unit) 111, a ROM (Read-Only Memory) 112, and a RAM (Random-Access Memory) 113. The ROM 112 stores, for example, a program to be executed by the CPU 111. The RAM 113 is used as a work area of the CPU 111. For example, an electrically erasable programmable ROM may be used as the ROM 112.

The controller 11 is connected through a system bus 19 to the communicator 12, the storage 13, the operation display 14, the image reader 15, the image processor 16, the image former 17, the position information acquirer 18, and the human body detectors 60 (60_1, 60_2) in order to provide overall control of the image formation devices 10.

The communicator 12 receives job information transmitted from the print server 20 or the client PC 30 shown in FIG. 1 through the network 40. The communicator 12 transmits the received job information to the controller 11 through the system bus 19. The job information includes image data about an image to be formed, and information associated with the image data and indicative, for example, of the type of paper to be used and the number of sheets of paper.

The communicator 12 may establish communication by actively transmitting to an external device for the print server 20 or the client PC 30, by passively receiving from the external device, or by performing such transmission and reception. When, for example, a print job is to be submitted from the client PC 30 or other communication terminal connected to the same wired or wireless network, persons waiting in the vicinity of the image formation devices 10 may be reported to a user by displaying relevant information on the printer driver or by acquiring job information concerning the image formation devices 10 and displaying the acquired job information with a dedicated application or a web based application.

The storage 13 is formed, for example, of a hard disk. For example, the storage 13 stores image data about an original image read by the image reader 15 and outputted image data. The storage 13 further stores position information (coordinate information) about the installation positions of the image formation devices 10, which is acquired by the position information acquirer 18, and information based on the result of human body detection by the human body detectors 60.

The operation display 14 is a touch operation panel formed of a liquid-crystal display (LCD), an organic EL (Electro-Luminescence) display, or other similar display. The operation display 14 displays, for example, an instruction menu for the user and information about acquired image data. The operation display 14 includes a plurality of keys and functions as an input device that receives various instructions, characters, numerals, and other data keyed in by the user.

The image reader 15 optically reads an original image and converts the original image to an electrical signal. Image data generated by the image reader 15 and image data transmitted from the print server 20 or the client PC 30 are forwarded to the image processor 16.

The image processor 16 performs shading correction, image density adjustment, image compression, or other image processing on the received image data as needed. The image former 17 receives the image data subjected to image processing by the image processor 16, and forms an image on a recording medium in accordance with the received image data.

The position information acquirer 18, which is formed, for example, of a GPS (Global Positioning System), automatically acquires information about the installation positions of the image formation devices 10 (10_1, 10_2). However, the installation positions of the image formation devices 10 need not necessarily be automatically acquired, but may be manually entered by the user through the operation display 14. The position information about the installation positions may be represented by absolute coordinates or position coordinates relative to predetermined coordinates.

The human body detectors 60 (60_1, 60_2) detect the presence (existence) of human bodies in the vicinity of the image formation devices 10 (10_1, 10_2). An example of the human body detectors 60 is described in more detail below.

The human body detectors 60 are capable of detecting the position coordinates of various parts of one or more human bodies by employing a well-known depth sensor and performing data processing to extract skeleton models of human bodies. The human body detectors 60 can determine the direction in which a human body faces, the posture of the human body, and the behavior of the human body that can be estimated from chronological changes. Further, the human body detectors 60 can estimate the future usage of the image formation devices 10 by managing human body information about a plurality of detected persons as a user (a person waiting in the vicinity of an image formation device 10 in order to use the image formation device 10). For example, well-known various sensors, such as Kinect (registered trademark) sensors, may be used as the human body detectors 60.

Figure 3A:
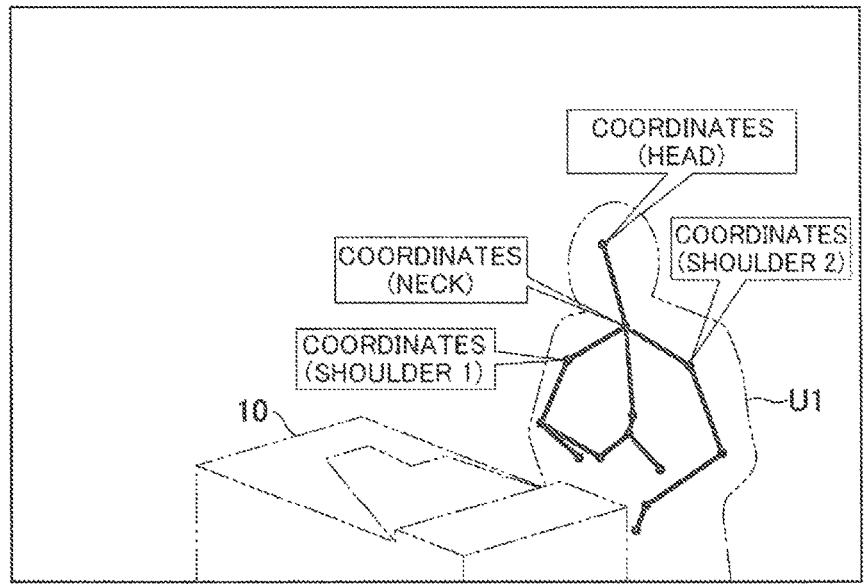
FIGS. 3A and 3B are diagrams illustrating images of detected human bodies that are derived from image data acquired by a camera in a human body detector.
Figure 3B:
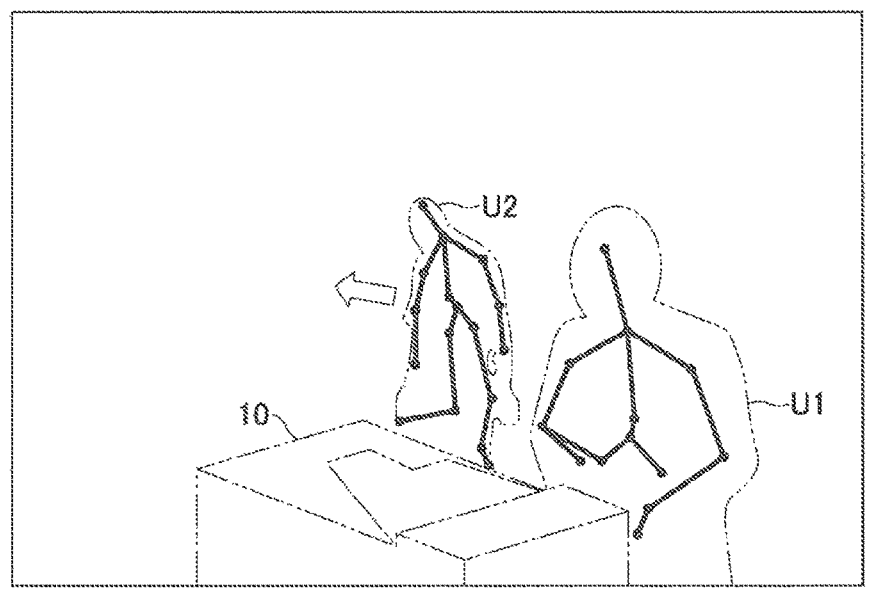

FIGS. 3A and 3B illustrate images of detected human bodies that are derived from image data acquired by cameras in the human body detectors 60. FIG. 3A is a diagram illustrating coordinate detection example 1 of the human body detectors 60. Coordinate detection example 1 is an example in which a user U1 in the vicinity of an image formation device 10 is detected as a skeleton model to acquire coordinates of various parts (e.g., head, neck, shoulder 1, and shoulder 2). FIG. 3B is a diagram illustrating coordinate detection example 2 of the human body detectors 60. Coordinate detection example 2 is an example in which two users U1, U2 in the vicinity of an image formation device 10 are detected as skeleton models to acquire coordinates of various parts.

As illustrated in FIGS. 3A and 3B, the human body detectors 60 formed of a depth sensor are not only capable of detecting the number of human bodies in the vicinity of an image formation device 10, but also capable of acquiring coordinates of various parts. The user U2 shown in FIG. 3B is leaving in the direction of the arrow from an image formation device 10 after finishing the operation of the image formation device 10.

FIG. 4 illustrates an exemplary positional relationship between an image formation device 10 and the viewpoint of a human body detector 60 (e.g., a camera or other image pickup device/depth sensor) and exemplary detection coordinate axes. Information based on the result of human body detection by the human body detector 60 is temporarily stored in the image formation device 10 and subsequently stored in a predetermined external storage (e.g., a storage in the print server 20). The stored information is allocated, for example, to tables shown in FIG. 5.

The information based on the result of human body detection by the human body detector 60 includes, for example, parts coordinate information about human bodies detected by the human body detector 60, count information about human bodies detected by the human body detector 60, skeleton model information detected by the human body detector 60, personal posture information estimated from a skeleton model, and information indicative of the orientation of a person. These items of information can be used to estimate and manage the status (condition) of a person in the vicinity of the image formation device 10. More specifically, the status (condition) of a person can be estimated and managed, for example, by predicting a future behavior of the person, that is, determining whether the person is about to use the image formation device 10, is just passing through the vicinity of the image formation device 10, or is about to leave the image formation device 10 after finishing its operation.

In the image formation system 1 in which the image formation devices 10 (10_1, 10_2) having the above-described configuration are connected to the network 40 and equipped with the human body detectors 60 (60_1, 60_2), the present embodiment causes the storage 13 to store the information based on the result of human body detection by the human body detectors 60. Further, under the control of the controller 11, the present embodiment manages the tendency of persons in the vicinity of the image formation devices 10, for example, by determining, in accordance with the information based on a human body detection result stored in the storage 13, whether persons concerned with an image formation device 10 (10_1, 10_2) are in the vicinity of the image formation device.

As described above, the controller 11 functions as a manager that manages the tendency of persons in the vicinity of the image formation devices 10 (10_1, 10_2) in accordance with the information based on the human body detection result stored in the storage 13. FIG. 6 is a functional block diagram illustrating the controller 11, which functions as a manager.

As illustrated in FIG. 6, the controller 11 has various functional blocks, namely, a job manager 21, a detected human body processing time determiner 22, and a user manager 23. The functions of these functional blocks (21-23) are described in detail below.

The job manager 21 manages the status of a currently executed job or a job reserved for execution in an image formation device 10 or in the entire system to which the image formation device 10 is connected through the network 40. The job manager 21 manages at least one user managed by the user manager 23 as a job reserved for execution.

When at least one user managed by the user manager 23 is to be managed by the job manager 21 as a job reserved for execution, an appropriate time can be set as the processing time for the job reserved for execution. Further, when at least one user managed by the user manager 23 is to be managed by the job manager 21 as a job reserved for execution, the time to be set as the processing time for the job reserved for execution is acquired from the detected human body processing time determiner 22 in which the processing time for the job reserved for execution is associated with status information about the user.

The processing time for an unsubmitted job is set, for example, by acquiring the relevant processing time from a table showing the status of a user. Table 1 shows an exemplary table that is used to set the processing time when a user is to be registered in the job manager 21 as an unsubmitted job.

TABLE 1

| # | Detected human body status | Processing time (min) | Elapsed time (min) |
|---|---|---|---|
| 1 | Waiting | 5 | — |
| 2 | First in waiting line | 3 | 2 |
| 3 | Panel operation started | 2 | — |
| 4 | Job set and start button depressed | 1 | — |
| 5 | Job operation completed and internal processing in progress | 1 | — |
| 6 | Job submitted | (Job processing time applied) | — |

Referring to Table 1, for #1 "Waiting", when persons are waiting in line in front of an image formation device 10, jobs for all such waiting persons are set. For #2 to #5, the time can be set for each state of the first person in the waiting line. #6 represents a case where a job is already submitted although the first person in the waiting line exists. In this case, the processing time for the submitted job is managed, and the status of a user is updated after the lapse of a predetermined time. Thus, if a user who has already submitted a job is continuously waiting in front of the image formation device 10, the user is managed as the first person in the waiting line without changing the number of waiting persons.

The job manager 21 manages the parameters of a submitted job, which are found in an existing image formation device, and executes a print job in a predetermined order. That is to say, the job manager 21 manages print data retained by the storage 13 in an image formation device 10 as a print job (a job currently printed/a job waiting for printing) and successively feeds print data to the image former 17 in order to generate printed matter in a managed order. Further, the job manager 21 is capable of managing the processing completion time of each job in accordance, for example, with the number of prints of an already submitted print job and determining the time required for the completion of all jobs and an estimated completion time.

The job manager 21 further manages an estimated processing time for each human body, which is determined by the detected human body processing time determiner 22 in accordance with a human body status detected by the human body detector 60, in the same manner as for an already submitted job. Therefore, even before the submission of a job, the time required for the image formation device 10 to become unoccupied and the point of time at which the image formation device 10 becomes unoccupied can be substantially estimated from the status of persons in the vicinity of the image formation device 10 or the status of waiting persons.

Moreover, the job manager 21 estimates a person detected by the user manager 23 as a user as a person who will submit a job in the near future, and adds the person to the end of a list of jobs managed by the job manager 21 as an unsubmitted print job. Obviously, if such a user leaves the vicinity of the image formation device 10, the user manager 23 can immediately cancel the associated job and delete it from the list of managed jobs.

The detected human body processing time determiner 22 is a functional block that retains the processing time for a job actually executed by a human body detected by the human body detector 60, recalculates a predicted time based on the retained time from actually measured values of a number of jobs, and resets the predicted time as the processing time for an unsubmitted job in order to determine the processing time for the detected human body. Table 2 shows an example of an actual processing time management table. The tendency of a user can be determined from a history, for example, of submission completion time, job description, waiting time, and actual processing time in order to calculate a new processing time from an average value or an analysis result produced by artificial intelligence.

TABLE 2

| # | Submission completion time | Job description | Waiting time (min) | Actual processing time (min) |
|---|---|---|---|---|
| 1 | 2016/12/20 14:25 | Copy | 2 | 4 |
| 2 | 2016/12/20 14:29 | Copy | 1 | 2 |
| 3 | 2016/12/20 14:31 | Scan | 3 | 4 |
| 4 | 2016/12/20 14:35 | Fax | 6 | 1 |
| 5 | 2016/12/20 15:20 | Copy | 0 | 1 |
| 6 | 2016/12/20 15:40 | Print | 0 | 4 |
| 7 | 2016/12/20 15:44 | Print | 3 | 6 |
| 8 | 2016/12/20 15:50 | Copy | 5 | 15 |
| 9 | 2016/12/20 16:00 | Copy | 0 | 2 |
| 10 | 2016/12/20 16:02 | Copy | 2 | 1 |

The user manager 23 is a functional block that, based on the result of human body detection by a human body detector 60 (60_1, 60_2) that is stored in the storage 13, manages the position information about human bodies in the vicinity of an image formation device 10 and the number and status of persons recognized as users. As software tasks for human body detection, the user manager 23 includes a human body information detection task 231 and a human body information management task 232. The human body information detection task 231 and the human body information management task 232 will be described in detail later.

Figure 7:
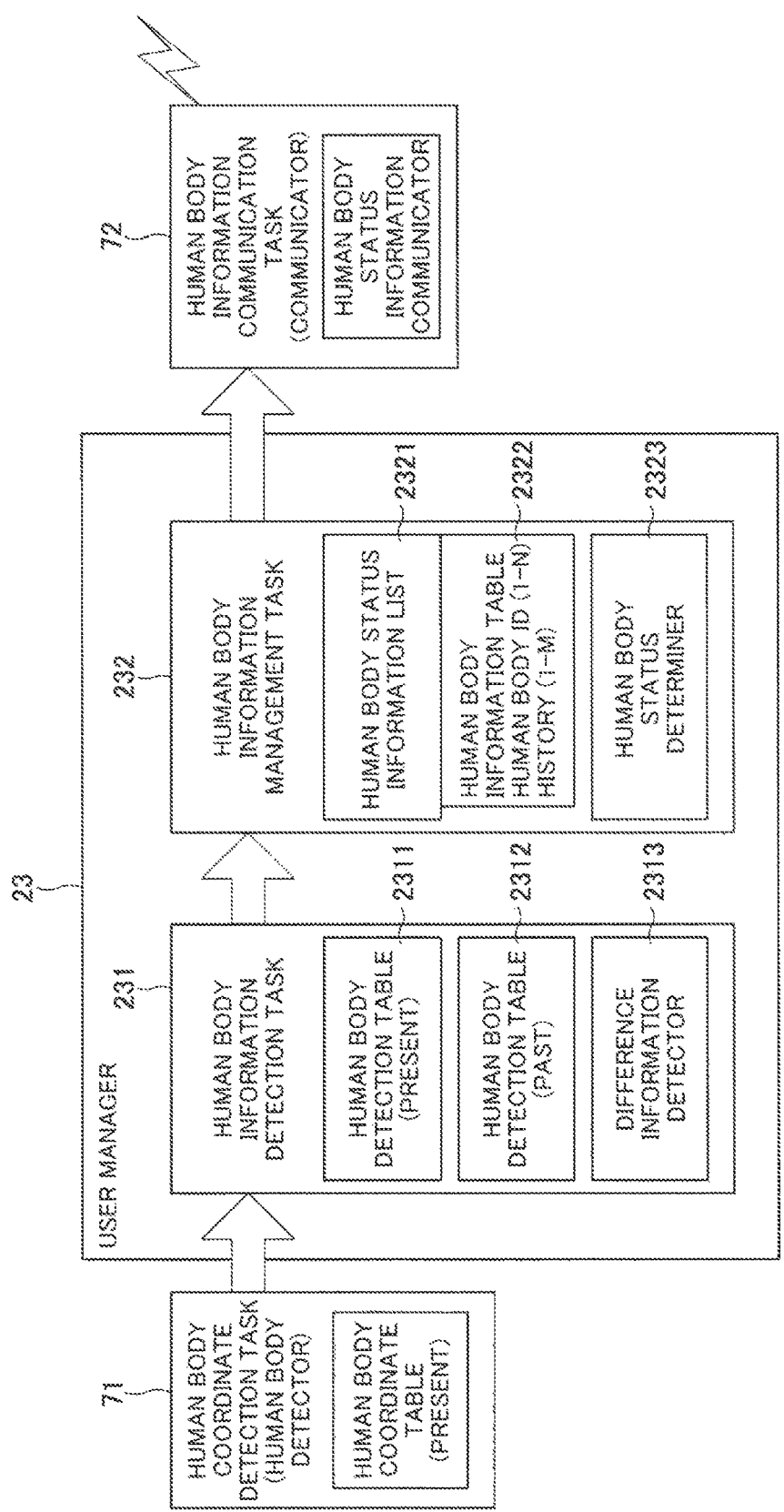
FIG. 7 is a block diagram illustrating an exemplary configuration of a software task for human body detection.

FIG. 7 is a block diagram illustrating an exemplary configuration of a software task for human body detection. The software task 70 includes a human body coordinate detection task 71, which acts as a human body detector 60, and a human body information communication task 72, which acts as the user manager 23 and the communicator 12.

The human body coordinate detection task 71 (i.e., human body detector 60) stores, in a human body coordinate table, human body coordinates of all detected human bodies that are derived from skeleton models. In the simplest configuration, the human body information communication task 72 (i.e., communicator 12) successively communicates human body coordinates.

The user manager 23 includes the human body information detection task 231 and the human body information management task 232. The human body information detection task 231 includes a human body detection table (present) 2311, a human body detection table (past) 2312, and a difference information detector 2313. The human body information detection task 231 copies information in the human body detection table (present) 2311 to the human body detection table (past) 2312 and stores latest human body coordinates acquired after the lapse of a predetermined time in the human body detection table (present) 2311. The difference information detector 2313 then checks for an informational difference between the human body detection table (present) 2311 and the human body detection table (past) 2312. If any informational difference is detected, the human body information detection task 231 notifies the human body information management task 232 of the detected informational difference.

The human body information management task 232 includes a human body status information list 2321, a human body information table 2322, and a human body status determiner 2323. The human body information management task 232 assigns an identification number (ID) to newly detected human body information and manages the identification number and detection time as human body status information.

The human body status information list 2321 manages information about the tendency of a plurality of persons including persons who no longer exist in the vicinity of an image formation device 10. However, the non-existing persons may be excluded and no longer managed. As the human body status information, the human body information table 2322 has one or more pieces of historical information about one detected human body, that is, a table of a plurality of different time points.

The human body status determiner 2323 detects differences from chronological changes in the historical information in the human body information table 2322 to determine the tendency (status/condition) of persons in the vicinity of the image formation device 10, and stores the resulting tendency information in the human body status information list 2321. The tendency of a person in the vicinity of the image formation device 10 may indicate that the person is, for example, approaching the image formation device 10, leaving the image formation device 10, simply passing the image formation device 10, or stopped in front of the image formation device 10.

The human body information communication task 72, which acts as the communicator 12, notifies the user of information indicative of the tendency of persons in the vicinity of the image formation device 10, which is managed by the human body information management task 232, for example, by displaying the information on the display (display device) of the client PC 30. This permits the user to more clearly determine the tendency of a person in the vicinity of the image formation device 10, that is, determine whether the person is, for example, approaching the image formation device 10, leaving the image formation device 10, simply passing the image formation device 10, or stopped in front of the image formation device 10.

(Exemplary Process of Human Body Information Detection Task)

Figure 8:
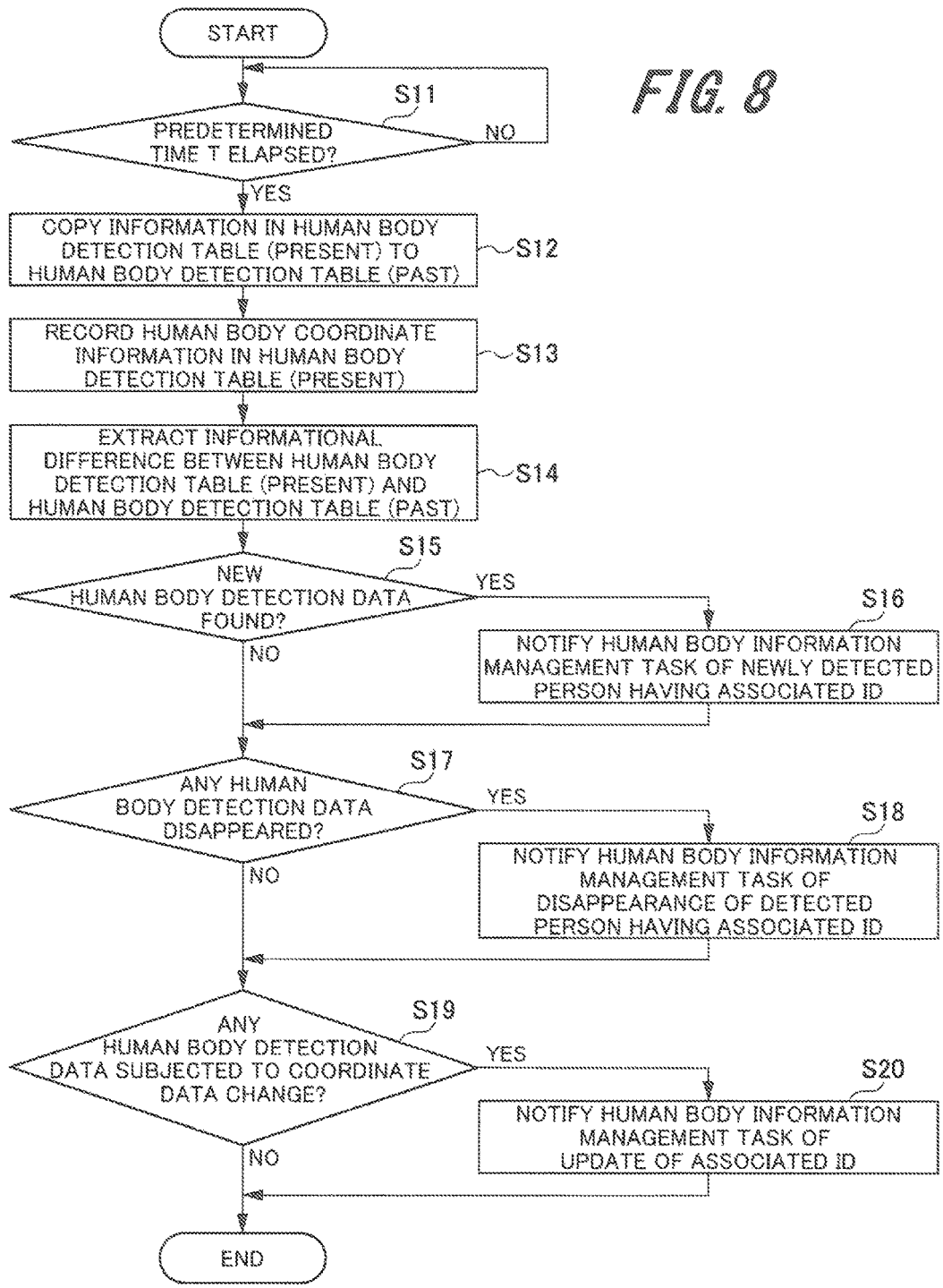
FIG. 8 is a flowchart illustrating an example of a human body information detection task process.

The human body information detection task 231 determines the appearance, disappearance, or transitional changes of a human body from human body coordinate information. An exemplary process of the human body information detection task 231 will now be described with reference to the flowchart of FIG. 8. A series of processing steps performed by the human body information detection task 231 is executed under the control of the controller 11, which handles the user manager 23 having the human body information detection task 231 as one functional block.

First of all, the controller 11 waits until a predetermined time T (msec) elapses (step S11). If the predetermined time T (msec) has elapsed (the query in step S11 is answered "YES"), the controller 11 copies the information in the human body detection table (present) 2311 to the human body detection table (past) 2312 (step S12), and then stores the human body coordinate information in the human body detection table (present) 2311 (step S13).

At this point of time, the contents of the human body detection table (present) 2311 are the same as the contents of the human body detection table (past) 2312. FIG. 5 illustrates an example of the human body detection tables (changes in parts coordinates) that set the result of detection by a human body detector 60.

Next, the controller 11 detects informational difference between the human body detection table (present) 2311 and the human body detection table (past) 2312 (step S14), and then checks for new human body detection data (step S15). If new human body detection data is found (the query in step S15 is answered "YES"), the controller 11 notifies the human body information management task 232 of a newly detected person having an associated ID (step S16).

If, by contrast, no new human body detection data is found (the query in step S15 is answered "NO"), the controller 11 checks for disappeared human body detection data (step S17). If disappeared human body detection data is found (the query in step S17 is answered "YES"), the controller 11 notifies the human body information management task 232 of the disappearance of a detected person having an associated ID (step S18).

If, by contrast, no disappeared human body detection data is found (the query in step S17 is answered "NO"), the controller 11 checks for human body detection data whose coordinate data is changed (step S19). If there is no changed human body detection data (the query in step S19 is answered "NO"), the controller 11 immediately terminates the series of processing steps of the human body information detection task 231. If, by contrast, there is human body detection data whose coordinate data is changed (the query in step S19 is answered "YES"), the controller 11 notifies the human body information management task 232 of the update of an associated ID (step S20), and then terminates the series of processing steps of the human body information detection task 231.

As described above, the user manager 23 having the human body information detection task 231 determines the status of a person at a predetermined time point from chronological changes in human body information recorded in the human body detection table (present) 2311 and the human body detection table (past) 2312.

More specifically, the tables shown in FIG. 5 indicate that no coordinate information exists at time 0 because no person is in front of an image formation device 10. At time 1, however, a human body is detected by a human body detector 60 so that a specific identification number xxxx and parts coordinates (x, y, z) are stored in an unoccupied area of a coordinate information storage table. At time 2, a human body having an identification number yyyy is newly detected so that coordinate information about a total of two persons is acquired. At time 3, the human body having the identification number yyyy is away from a detection range, and a human body having an identification number zzzz is newly detected. As the coordinates of various parts of the human body having the identification number xxxx are changed, it is determined that the human body having the identification number xxxx has moved.

(Exemplary Process of Human Body Information Management Task)

Figure 9:
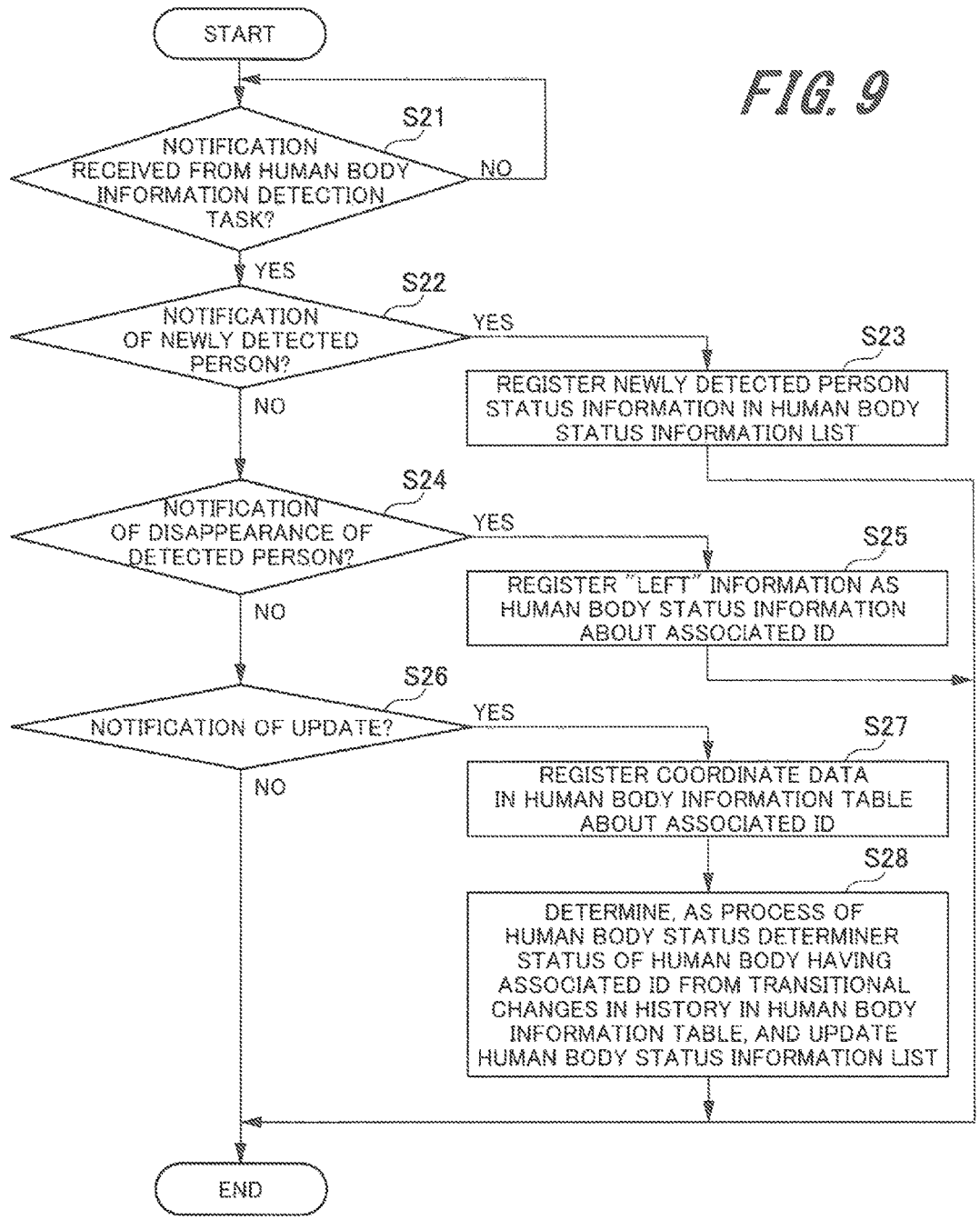
FIG. 9 is a flowchart illustrating an example of a human body information management task process.

The human body information management task 232 determines and manages the status of a detected human body in accordance with information detected or updated by the human body information detection task 231. An exemplary process of the human body information management task 232 will now be described with reference to the flowchart of FIG. 9. A series of processing steps performed by the human body information management task 232 is executed under the control of the controller 11, which handles the user manager 23 having the human body information management task 232 as one functional block.

First of all, the controller 11 waits for the reception of a notification from the human body information detection task 231 (step S21). If a notification is received from the human body information detection task 231 (the query in step S21 is answered "YES"), the controller 11 determines whether the received notification is about a newly detected person (step S22). If the received notification is about a newly detected person (the query in step S22 is answered "YES"), the controller 11 registers newly detected person status information in the human body status information list 2321 (step S23).

If, by contrast, the notification received from the human body information detection task 231 is not about a newly detected person (the query in step S22 is answered "NO"), the controller 11 determines whether the notification from the human body information detection task 231 is about the disappearance of a detected person (step S24). If the notification from the human body information detection task 231 is about the disappearance of a detected person (the query in step S24 is answered "YES"), the controller 11 registers "Left" information as the human body status information about an associated ID (step S25).

If, by contrast, the notification from the human body information detection task 231 is not about the disappearance of a detected person (the query in step S24 is answered "NO"), the controller 11 determines whether the notification from the human body information detection task 231 is about an update (step S26). If the notification from the human body information detection task 231 is about an update (the query in step S26 is answered "YES"), the controller 11 registers coordinate data in the human body information table 2322 about an associated ID (step S27).

Subsequently, as a process of the human body status determiner 2323, the controller 11 determines the status of the human body having the associated ID from transitional changes in the history in the human body information table 2322 in order to update the human body status information list 2321 (step S28), and then terminates the series of processing steps of the human body information management task 232. If the notification from the human body information detection task 231 is not about an update (the query in step S26 is answered "NO"), the controller 11 immediately terminates the series of processing steps of the human body information management task 232.

(Exemplary Transitional Changes in Detected Coordinates)

Figure 10:
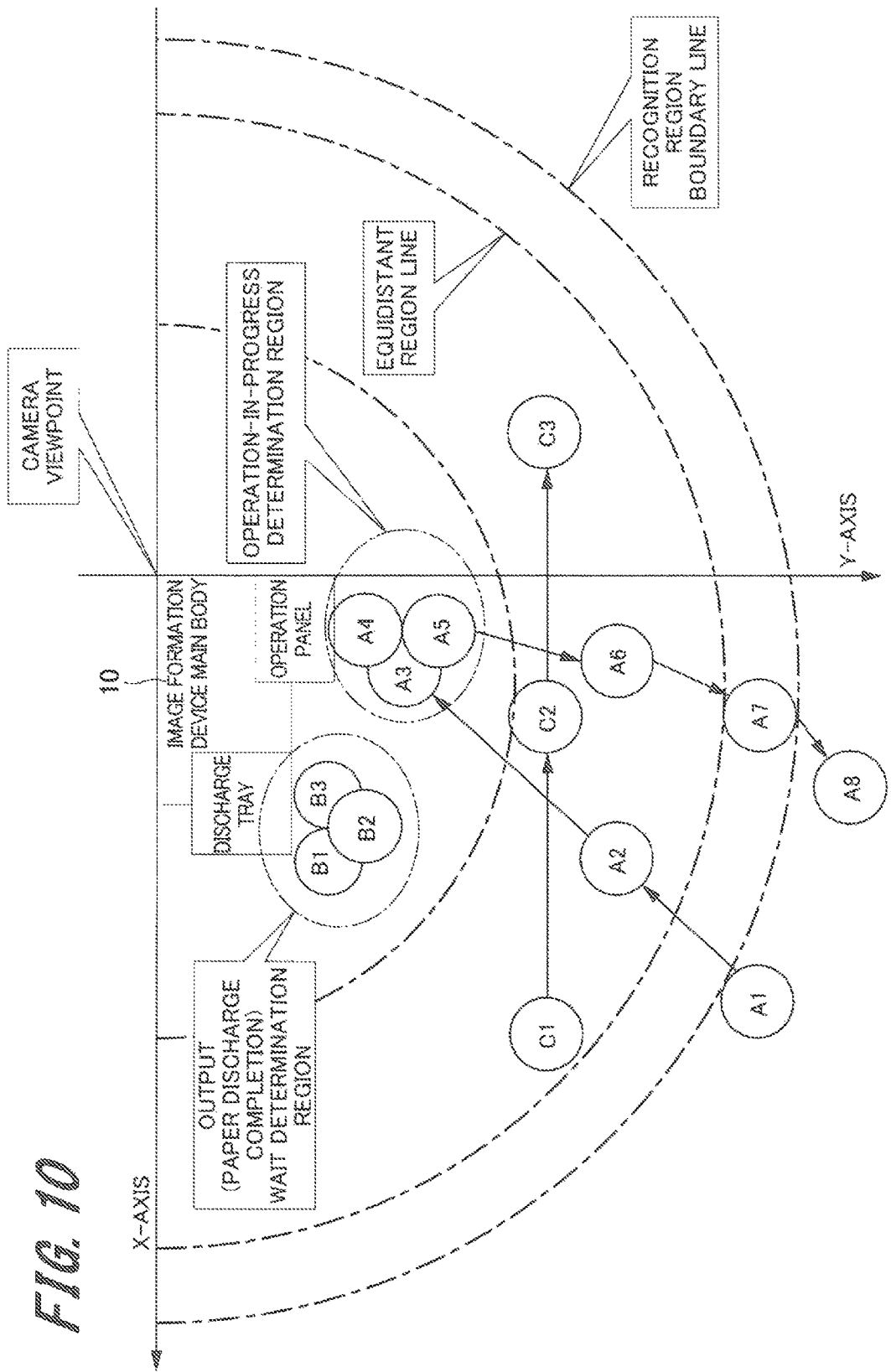
FIG. 10 is a diagram illustrating a human body detection range centered on the image formation device and exemplary transitional changes in human body coordinates detected within the human body detection range.

FIG. 10 presents exemplary transitional changes in detected coordinates by illustrating a human body detection range centered on an image formation device 10 and exemplary transitional changes in human body coordinates detected within the human body detection range.

Referring to FIG. 10, semicircles centered on the image formation device 10, which are each shown by a one-dot chain line, represent equidistant lines from the image formation device 10. The image formation device 10 includes an operation panel and a paper discharge tray (output product outlet). Specific status determination regions, namely, an operation-in-progress determination region and an output (paper discharge completion) wait determination region, are set for the vicinities of the operation panel and paper discharge tray.

Table 3 shows an example of human body status determination from transitional changes in detected coordinates.

When the example of human body status determination, which is shown in Table 3, is viewed based on the movement from A1 to A8 in a situation where the amount of change in the distance is substantially equal to the amount of change in the coordinates, a human body is determined to be "Approaching" if the distance is decreasing, and is determined to be "Leaving" if the distance is increasing. If the amount of change in the distance is smaller than the amount of change in the coordinates as is the case with C1 to C3, the human body is determined to be "Passing" because there is no intention of approaching the image formation device 10. If extremely small or no changes occur in the coordinates and in the distance, the human body is determined to be "Staying". Further, if the coordinates detected during such a staying state are within the output wait determination region, which is defined as the region in front of the paper discharge tray, as is the case with B1 to B3, the human body is determined to be "Waiting for output". Furthermore, if the coordinates detected during such a staying state are within the operation-in-progress determination region, which is defined as the region in front of the operation panel, as is the case with A1 to A5, the human body is determined to be "Using". If the coordinates detected during such a staying state are within a different region, the human body is determined to be "Waiting to use".

(Exemplary Status Display of Printer Driver)

The client PC 30, which is an example of a terminal device, includes a display that displays the result of human body detection achieved under the control of the controller 11. FIG. 11 illustrates an example of printer driver status display as a display example of the client PC 30. This status display example shows, for example, a document name, a status (e.g., printing, waiting, or staying), an owner, a page count, a size, and a reception time in a list form.

However, if a person existing in front of the image formation device 10 is going to execute a scan or copy job although it is not registered as a job in the image formation device 10, a print job requiring a panel operation, that is, for example, confidential printing or pull printing, cannot be executed. This results in a delay in the substantial acquisition of a deliverable (output product). Further, if a confidential document is to be printed, such a print cannot actually be outputted because an output operation needs to be performed near persons lined up so that an output product may be visible to the other persons.

Meanwhile, the image formation system 1 according to the present embodiment, which is configured as described above, includes the human body detectors 50, 60, stores information based on the result of human body detection by

TABLE 3

| Detected human body | Transitional coordinate changes | | | Determination result | | | | |
|---|---|---|---|---|---|---|---|---|
| | T1 | T2 | T3 (present) | State 1 | State 2 | State 3 | Counted as a job | Detection |
| Human body A | A1 | A2 | A3 | Approaching | Non-user | Approach | YES | Detected |
| Human body A | A3 | A4 | A5 | Using | User | Staying | YES | Detected |
| Human body A | A5 | A6 | A7 | Leaving | Non-user | Left | NO | Detected |
| Human body A | A6 | A7 | A8 | Leaving | Non-user | Left | NO | Undetected |
| Human body A | A2 | A4 | A6 | Leaving | Non-user | Left | NO | Detected |
| Human body A | A1 | A2 | A2 | Approaching | Waiting to use | Staying | YES | Detected |
| Human body B | B1 | B2 | B3 | Waiting for output | User | Staying | NO | Detected |
| Human body C | C1 | C2 | C3 | Passing | Non-user | Passed | NO | Detected | the human body detectors 50, 60, and manages the tendency of persons in the vicinity of the image formation devices 10 in accordance with the stored information.

Consequently, it is possible to recognize users and prospective users in the vicinity of the image formation devices 10, and predict a substantial job processing time in consideration of unsubmitted jobs, which are not yet submitted into the image formation devices 10. Further, for example, the client PC 30 disposed at a remote place can be notified of a predicted processing time and detected human body status information. This not only enables a user submitting a print job to reduce the time required for the substantial acquisition of a deliverable, but also selects and notifies the user of an image formation device 10 whose vicinity is unoccupied by persons.

That is to say, when a print job is to be submitted from the client PC 30, which is a terminal device, the user can view a printer driver display shown, for instance, in FIG. 11 to grasp the tendency of persons in the vicinity of the image formation devices 10, that is, determine whether the persons in the vicinity of the image formation devices 10 are, for example, the users or prospective users of the image formation devices 10. Further, it is possible to reduce the time required for the acquisition of a deliverable (output product) by selecting an image formation device 10 that is not being used by any user or not going to be used by any prospective user or is being used by few users or going to be used by few prospective users. Moreover, in the case of a confidential job (confidential printing), an image formation device for which no person is lined up can be selected to maintain security.

When selecting an optimum image formation device 10, the print server 20 acquires print job information about each image formation device 10 and selects an image formation device 10 that makes it possible to obtain printed matter most rapidly. If, in this instance, there are a plurality of candidates, an image formation device 10 whose vicinity is unoccupied by another user (no user is operating the image formation device 10) can be selected.

[Image Formation System Control Method and Control Program]

As mentioned above, an image formation system control method according to an embodiment of the present invention is used in the image formation system 1, which includes the human body detectors 50, 60 for detecting whether human bodies are present in the vicinity of the image formation devices 10, in order to store information based on the result of detection by the human body detectors 50, 60 and manage the tendency of persons in the vicinity of the image formation devices 10 in accordance with the stored information. As described earlier, the series of processing steps performed for such management is executed under the control of the controller 11.

Further, an image formation system control program according to an embodiment of the present invention is capable of performing the above-mentioned series of processing steps, which is executed under the control of the controller 11, by issuing a programmed instruction to the CPU 111 (see FIG. 2) in the controller 11 formed of a microcomputer, which is an example of a computer. The image formation system control program (the control program according to the embodiment of the present invention), which causes the CPU 111 to perform the series of processing steps, may be preinstalled in the ROM 112 (see FIG. 2) in the controller 111. However, the image formation system control program need not necessarily be preinstalled in the ROM 112, but may be supplied by a wired or wireless communicator or supplied on a computer-readable storage medium such as an IC card or a USB memory.

[Modification]

While the present invention has been described in conjunction with foregoing embodiments, the present invention is not limited to the foregoing embodiments. Persons of skill in the art will appreciate that various modifications and improvements can be made without departing from the scope and spirit of the present invention. Embodiments obtained by making such modifications and improvements are also included in the technical scope of the present invention. The scope of the present invention should be defined by the appended claims.

For example, the foregoing embodiments assume that the image formation system 1 is configured to include two image formation devices 10, one print server 20, and one client PC 30. However, the image formation system 1 is not limited to such a configuration. The image formation system 1 may include any number of elements. Further, the foregoing embodiments assume that the storage 13 in each image formation device 10 is used to store information based on the result of human body detection. However, the present invention is not limited to such a configuration. An alternative is to use a storage that is installed at a distance from each image formation device 10.

REFERENCE SIGNS LIST 1 image formation system
10 (10_1, 10_2) image formation device
11 controller
12 communicator
13 storage
14 operation display (operation panel)
15 image reader
16 image processor
17 image former
18 position information acquirer
20 print server
21 job manager
22 detected human body processing time determiner
23 user manager
30 client PC
40 network
50, 60 (60_1, 60_2) human body detector
70 software task for human body detection
71 human body coordinate detection task
72 human body information communication task

What is claimed is:
1. An image formation system comprising:
a plurality of image formation devices that are connected to a network;
a human body detector that detects whether human bodies are present in the vicinity of the image formation devices;
a storage that stores information based on the result of human body detection by the human body detector;
a manager that manages the tendency of persons in the vicinity of the image formation devices in accordance with the information based on the human body detection result stored in the storage;
wherein the manager includes a user manager that manages chronological position information about human bodies in the vicinity of the image formation devices in accordance with the information based on the human body detection result stored in the storage; and wherein the user manager assigns an identifier to the information based on the human body detection result and manages the identifier and detection time as human body status information.

2. The image formation system according to claim 1, wherein the human body detector is an image input device, a temperature sensor, an infrared ray sensor, an ultrasonic wave sensor, a laser Doppler sensor, a directional microphone, a pressure sensor, an operation panel touch sensor, an authenticator, a near-field communication device using an electronic tag carried by a user and a mobile terminal, or a combination thereof.

3. The image formation system according to claim 1, wherein the human body detector is disposed integrally with the image formation devices or disposed within a system that is positioned away from the image formation devices.

4. The image formation system according to claim 1, wherein the storage is disposed in the image formation devices or at a distance from the image formation devices.

5. The image formation system according to claim 1, wherein the information based on the result of human body detection by the human body detector is coordinate position information about a human body, information indicative of the number of persons, skeleton model information, personal posture information, and information indicative of the orientation of a person.

6. The image formation system according to claim 1, wherein the human body status information includes one or more items of historical information about each human body detected by the human body detector; and
wherein the manager includes a human body status determiner that determines the status of a person in accordance with transitional changes in the historical information.

7. The image formation system according to claim 1, wherein the manager includes a job manager that manages the status of a currently executed job or a job reserved for execution in the image formation devices or in the entire system; and
wherein the job manager manages at least one user managed by the user manager as a job reserved for execution.

8. The image formation system according to claim 7, wherein the job manager is capable of setting an appropriate time as the processing time for the job reserved for execution.

9. The image formation system according to claim 8, wherein the manager includes a detected human body processing time determiner that determines the processing time for a human body detected by the human body detector; and
wherein the job manager acquires the appropriate time to be set as the processing time for the job reserved for execution from the detected human body processing time determiner in which the processing time for the job reserved for execution is associated with status information about a user.

10. The image formation system according to claim 9, wherein the detected human body processing time determiner retains the processing time for a job actually executed by a human body detected by the human body detector, recalculates a predicted time based on the retained time, and resets the predicted time as the processing time for an unsubmitted job.

11. The image formation system according to claim 1, wherein the tendency of persons is the number of persons in the vicinity of the image formation devices, the positions of the persons, or the chronological movements of the persons.

12. The image formation system according to claim 1, wherein the human body detector is configured to determine a direction in which a human body faces, a posture of the human body, or a behavior of the human body that can be estimated from chronological changes.

13. The image formation system according to claim 1, wherein the manager is configured to determine a future behavior of a person using the stored information.

14. The image formation system according to claim 1, wherein managing the tendency of persons in the vicinity of the image formation devices in accordance with the information based on the human body detection result stored in the storage includes determining whether persons are present near the image formation devices.

15. An image formation system control method that is exercised in an image formation system including a plurality of image formation devices and a human body detector, the image formation devices being connected to a network, the human body detector detecting whether human bodies are present in the vicinity of the image formation devices, the image formation system control method causing the image formation system to perform:
storing, in a storage, information based on the result of human body detection by the human body detector;
managing the tendency of persons in the vicinity of the image formation devices in accordance with the information based on the human body detection result stored in the storage, and wherein managing the tendency of persons in the vicinity of the image formation devices includes managing chronological position information about human bodies in the vicinity of the image formation devices in accordance with the information based on the human body detection result stored in the storage; and
assigning an identifier to the information based on the human body detection result and manages the identifier and detection time as human body status information.

16. A non-transitory computer-readable recording medium storing an image formation system control program that is executed in an image formation system including a plurality of image formation devices and a human body detector, the image formation devices being connected to a network, the human body detector detecting whether human bodies are present in the vicinity of the image formation devices, the image formation system control program causes a computer to perform:
a process of storing, in a storage, information based on the result of human body detection by the human body detector; and
a process of managing the tendency of persons in the vicinity of the image formation devices in accordance with the information based on the human body detection result stored in the storage, and wherein the process of managing the tendency of persons in the vicinity of the image formation devices includes managing chronological position information about human bodies in the vicinity of the image formation devices in accordance with the information based on the human body detection result stored in the storage; and
a process of assigning an identifier to the information based on the human body detection result and manages the identifier and detection time as human body status information.

* * * * *